(12) United States Patent
Walker et al.

(10) Patent No.: US 6,193,155 B1
(45) Date of Patent: *Feb. 27, 2001

(54) METHOD AND APPARATUS FOR ISSUING AND MANAGING GIFT CERTIFICATES

(75) Inventors: Jay S. Walker, Ridgefield; Daniel E. Tedesco; James A. Jorasch, both of Stamford; Robert R. Lech, Norwalk, all of CT (US)

(73) Assignee: Walker Digital, LLC, Stamford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/997,680

(22) Filed: Dec. 23, 1997

Related U.S. Application Data

(63) Continuation-in-part of application No. 08/762,128, filed on Dec. 9, 1996, now Pat. No. 5,798,508, and application No. 08/858,738, filed on May 19, 1997.

(51) Int. Cl.[7] .............................. G06F 7/00; G06F 17/00

(52) U.S. Cl. ............................. 235/381; 902/22; 705/44

(58) Field of Search ................................ 235/380, 381, 235/382, 382.5, 495, 379; 902/22; 705/47, 39

(56) References Cited

U.S. PATENT DOCUMENTS

| | | |
|---|---|---|
| 3,594,727 | 7/1971 | Braun . |
| 3,617,638 | 11/1971 | Jochimsen et al. . |
| 3,697,693 | 10/1972 | Deschenes et al. . |

(List continued on next page.)

FOREIGN PATENT DOCUMENTS

| | | |
|---|---|---|
| WO/ 98/26376 | 6/1998 | (WO) . |

OTHER PUBLICATIONS

"New American Express Travelers Cheque Operations Center Speeds Service to Banks", The Magazine of Bank Management, Feb., 1983 Features Section at p. 48.

"Bank–Of–America; BankAmerica Expands Travelers Cheque Services", Business Wire, Jul. 6, 1987, Distribution to Business/Travel Editors.

"Treasury Proposes $ 3000–and–over Cash ID Regulations; $ 10,000 Daily Penalty per Violation for "Gross Negligence" Applies", Money Laundering Alert, Alert International, Inc. Oct., 1989, Regulatory Action Section; vol. 1, No. 1; at p. 5.

Eve Tahmincioglu, "American Express Introduces Corporate Travelers Checks", U. P. I. Feb. 11, 1992, BC Cycle, Financial Section.

(List continued on next page.)

Primary Examiner—Michael G Lee
Assistant Examiner—Drew A. Dunn
(74) Attorney, Agent, or Firm—Kurt M. Maschoff; Dean Alderucci

(57) ABSTRACT

The present invention relates to a method and apparatus for issuing and redeeming a gift certificate drawn on a credit card or other financial account. The present invention includes a first aspect directed to a merchant card authorization terminal and a second aspect directed to a credit card issuer central controller. According to the first aspect, a method for redeeming a gift certificate drawn on a financial account is disclosed including the steps of receiving a gift certificate for payment of an identified value, transmitting a request for authorization to a central server, receiving an authorization signal, representing an indication that redemption of the gift certificate is authorized, from said central server and receiving a payment from the account issuer based on said identified value. A system is also disclosed for implementing the methods in all aspects of the present invention.

67 Claims, 16 Drawing Sheets

U.S. PATENT DOCUMENTS

| | | |
|---|---|---|
| 3,950,015 | 4/1976 | Shrock . |
| 3,985,998 * | 10/1976 | Crafton ................................. 235/380 |
| 4,752,676 * | 6/1988 | Leonard et al. ...................... 235/379 |
| 4,997,188 | 3/1991 | Nilssen . |
| 5,010,485 | 4/1991 | Bigari ................................... 235/379 |
| 5,350,906 | 9/1994 | Brody et al. . |
| 5,357,563 | 10/1994 | Hamilton et al. . |
| 5,377,271 | 12/1994 | Foreman et al. ........................ 380/51 |
| 5,399,874 | 3/1995 | Gonsalves et al. . |
| 5,426,281 | 6/1995 | Abecassis . |
| 5,477,047 | 12/1995 | Nakagawa et al. ............... 250/208.1 |
| 5,513,117 | 4/1996 | Small .................................... 235/381 |
| 5,546,523 | 8/1996 | Gatto . |
| 5,652,421 * | 7/1997 | Veeneman et al. ................... 235/381 |
| 5,686,713 | 11/1997 | Rivera . |
| 5,765,141 * | 6/1998 | Spector ................................... 705/14 |
| 5,798,508 * | 8/1998 | Walker et al. ....................... 235/380 |
| 5,864,830 | 1/1999 | Armetta et al. ...................... 235/380 |
| 5,870,718 | 2/1999 | Spector ................................ 235/381 |
| 5,953,710 | 9/1999 | Fleming ................................ 235/380 |

OTHER PUBLICATIONS

Phil Britt, "Travelers Checks: An Uncertain Future; Includes Related Article", Savings & Community Banker, Mar., 1995, vol. 4; No. 3; p. 31; ISSN: 10567–1757.

"Prepared Testimony of David Boyles, Senior Vice President, New Business Ventures, Stored Value Group, Smart Card Center of Excellence, American Express Travel Related Services, Inc., Before The House Banking and Financial Services Commitee, Domestic And International Monetary Policy Subcommittee", Federal News Service, Jun. 11, 1996.

PCT Written Opinion for Application No. PCT/US97/22564, Nov. 12, 1998.

"American Express Continues Innovative Support of Citymeals–On–Wheels", PR Newswire, Oct. 30, 1987, Distribution to Business and City Desks.

Brenda Fine, "Be My Guest", The National Law Journal, Apr. 24, 1989 at p. 29.

"American Express Unveils Marketing Programs To Boost Traffic In The Restaurant Industry", PR Newswire, May 20, 1991, Financial News Section.

Peter O. Keegan, "Charge! AMEX Sets Out to Lure Back Diners; Credit Card Giant Unveils New Marketing Program During 72nd NRA Show; American Express Co., National Restaurant Association; Marketing", Nations Restaurant News, Jun. 3, 1991, vol. 25; No. 22; p. 12; ISSN: 0028–0518.

Bill Carlino, "AMEX Dispute Reaches Canada; Operators Promote Other Cards In Effort to Force AMEX Rate Cuts; News", Nation's Restaurant News, Jul. 22, 1991, vol. 25; No. 28; p. 3; ISSN: 0028–0518.

* cited by examiner-

| CERTIFICATE IDENTIFIER 510 | ACCOUNT IDENTIFIER 512 | MAXIMUM VALUE 514 | EXPIRATION DATE 516 | STATUS 518 |
|---|---|---|---|---|
| 2222-1234-5678-9000 | 2222-3333-4444-5555 | $50.00 | 10/15/97 | REDEEMED |
| 2222-3434-5656-7878 | 2222-8888-7777-6666 | $100.00 | 10/30/97 | ISSUED |
| 2222-1111-1111-1111 | 2222-8888-7777-6666 | $50.00 | 10/30/97 | REDEEMED |

| SECURITY CODE 520 | PERSONALIZED CHALLENGE 522 | PERSONALIZED RESPONSE 524 | USES REMAINING 526 | VALUE REMAINING 528 |
|---|---|---|---|---|
| 1234 | MOTHER'S MAIDEN NAME | SMITH | 0 | $2.41 |
| 06468 | PHONE NUMBER | (203) 555-1212 | N/A | $100.00 |
| 9101 | DATE OF BIRTH | 5/22/74 | 1 | $2.05 |

| ACCOUNT / CERTIFICATE IDENTIFIER 610 | DATE 612 | TIME 614 | REFERENCE CODE 616 | AUTHORIZATION CODE 618 | TRANSACTION AMOUNT 620 |
|---|---|---|---|---|---|
| 2222-1234-5678-9000 | 4/15/97 | 11:00 AM | A059GHZX | 223952 | $47.59 |
| 2222-3333-4444-5555 | 4/15/97 | 12:30 PM | V5CZQ378 | 768573 | $98.68 |
| 2222-8888-7777-6666 | 4/16/97 | 10:35 AM | KL43QR56 | 981366 | $50.00 |
| 2222-1111-1111-1111 | 4/16/97 | 2:43 PM | 34CE5G89 | 742511 | $47.95 |

| MERCHANT IDENTIFIER 710 | DATE 712 | TIME 714 | ACCOUNT / CERTIFICATE IDENTIFIER 716 | TRANSACTION AMOUNT 718 | AUTHORIZATION CODE 720 |
|---|---|---|---|---|---|
| 454838 | 4/15/97 | 11:00 AM | 2222-3333-4444-5555 | $47.59 | 223952 |
| 879566 | 4/15/97 | 12:30 PM | 2222-9898-2345-5473 | $98.68 | 768573 |
| 124987 | 4/16/97 | 10:35 AM | 2222-8888-7777-6666 | $50.00 | 981366 |
| 356357 | 4/16/97 | 2:43 PM | 2222-1111-1111-1111 | $47.95 | 742511 |

FIG. 7

METHOD AND APPARATUS FOR ISSUING AND MANAGING GIFT CERTIFICATES

CROSS-REFERENCE TO RELATED CORRESPONDING APPLICATIONS

This is a continuation-in-part of commonly owned, co-pending U.S. patent application Ser. No. 08/762,128 entitled "Postpaid Traveler's Checks" filed Dec. 9, 1996, U.S. Pat. No. 5,798,508, and commonly owned, co-pending U.S. application Ser. No. 08/858,738 entitled "System and Process for Issuing and Managing Forced Redemption Vouchers having Alias Account Numbers" filed May 19, 1997, the entirety of each incorporated by reference herein.

This application is related to co-pending application (attorney title: "Dynamically Changing System for Fulfilling Concealed Value Gift Certificate Obligations," attorney docket number 08/994,124, filed Dec. 19, 1997, inventors: Jay S. Walker, Andrew S. Van Luchene, Daniel E. Tedesco, James A. Jorasch), the entirety of which is incorporated by reference herein.

BACKGROUND OF THE INVENTION

1. Field of the Invention

The present invention relates generally to the field of transaction processing methods and apparatus. More particularly, the present invention relates to methods and apparatus for issuing and processing gift certificates which may be issued and redeemed in conjunction with credit card accounts.

2. Description of the Related Art

Businesses and consumers have employed a variety of transaction processing methods and apparatus to facilitate commerce while preventing fraud. In particular, credit card issuers facilitate hundreds of billions of dollars of purchases every year by allowing customers to conveniently pay for purchases utilizing their account services. For these services, the credit card issuers receive transaction fees from the merchants, as well as interest payments on all outstanding balances and annual fees from customers. In an effort to generate more revenues, many credit card issuers have developed marketing programs to encourage card holders to make more purchases with their credit cards.

In addition, the existence and use of store-type or specific-use gift certificates have proven transaction processing benefits. Typically, such gift certificates are issued by a store in pre-defined face value amounts. The consumer pays for the gift certificate in advance and then gives the certificate to a recipient who later redeems the certificate. A significant disadvantage associated with traditional gift certificates, however is that since the certificates are prepaid, the card holder pays for the certificates even if they are subsequently lost or never used. Further, there is presently no way to verify the authenticity of such gift certificates, making them prone to fraudulent duplication or alteration.

Some shopping malls offer mall-wide gift certificates which can be used at any store in a particular mall. Typically, these certificates are standard commercial checks with the mall checking account number printed thereon. Usually, any store in the mall accepts the gift certificate because it can be deposited in the same manner as a personal check. Typically, the mall takes the money from customers and places it in a checking account to "back-up" or cover the gift certificate check. These certificates, however, have the disadvantage of being easy to fraudulently duplicate.

Credit card companies have developed marketing programs that incorporate many of the features of gift certificates as described above. General Electric Company's GE Rewards Visa Credit Card program, for example, allows a credit card customer to automatically receive a five dollar rebate certificate for a specified volume of charges. The rebate certificates are automatically included in the credit card customer's monthly billing statement in the form of laser-printed vouchers. Although the rebate certificates are bearer instruments, making them easily redeemable, they may only be redeemed at the specific merchant or franchise printed on the face of the rebate certificate, reducing the redemption options of the recipient. Additionally, because there is no online verification of authenticity, the rebate certificates are vulnerable to counterfeit fraud.

To provide greater access to funds to card holders and to promote account activity, some credit card issuers offer convenience checks to their customers. These checks carry indicia directly linking the check to a customer's credit card account and can be used by the card holder as payment in the same manner as conventional personal checks. One difference between convenience checks and personal checks is that the former are treated as cash advances against a card holder's available credit line, instead of being deducted from money on deposit in a checking account. Large numbers of convenience checks are regularly mailed by banks and card issuers as way to promote additional consumer charge volume, encouraging consumers to build up credit card balances. Moreover, convenience checks are also used to encourage card holders to pay off other credit cards they might hold, thereby, effectively transferring the balance. Because there is no online authentication process, however, these checks are subject to the same fraud problems as conventional checks and gift certificates.

With losses from check fraud now exceeding ten billion dollars per year, many merchants are only willing to accept a personal check if the check is accompanied by photo identification as well as a major credit card to prevent fraud. For this reason, convenience checks are not well suited as gift items since a recipient's name cannot be pre-printed on the check. Additionally, card holders with balances near their credit line may be reluctant to make further purchases after giving out convenience checks to recipients, thereby defeating the purpose of incenting charge volume. Convenience checks returned to the issuer for clearing might result in the card holder's account exceeding the established limit if the card holder had made additional purchases.

Some credit card companies have offered other limited-use programs combining credit cards with gift certificates, such as the AMERICAN EXPRESS GIFT CHECK program and the AMERICAN EXPRESS "BE MY GUEST" program. The AMERICAN EXPRESS GIFT CHECK program allowed card holders to purchase pre-paid "gift checks" in certain specified denominations by either paying for them in cash or by charging them to their AMERICAN EXPRESS account. Once paid for and provided to a card holder, the gift check could be given to a recipient who may redeem the gift check at a merchant. Because the gift checks are processed in the same manner as traveler's checks, the recipient can only redeem such checks wherever AMERICAN EXPRESS traveler's checks are accepted, reducing the utility of the checks. Additionally, gift checks stolen in the mail may be fraudulently redeemed.

The AMERICAN EXPRESS "BE MY GUEST" program used a variable-value gift certificate known as a "BE MY GUEST" certificate. This gift certificate entitled a recipient, for example, to a meal at a participating restaurant at a card holder's expense. The certificate is accompanied by an AMERICAN EXPRESS charge slip in which the gift amount and card holder's credit card account number are already recorded. The card holder obtains the certificate from AMERICAN EXPRESS by requesting the same, and is charged the full designated value when the certificate is used or presented to a participating restaurant. The conventional credit card clearing process provides online authentication of the certificate. Minimal fraud prevention is provided in that a user presenting falsified duplicate certificates will eventually be denied service since the card holder's credit limit will eventually be exceeded. However, although losses to restaurants are potentially capped at the credit limit of the card holder, the card holder and card issuer still may experience substantial losses. In addition, attempts to fraudulently alter the amount of the certificate may not be detected, thereby allowing for more casual fraud. There are also significant security problems associated with the use of the certificates since the recipient can see the credit card account holder's AMERICAN EXPRESS account number. The recipient or an unscrupulous third party may receive the certificate, write down the account number, use the certificate, and then use the card number for purchases made over the Internet or by telephone.

Accordingly, it would be advantageous to provide an improved method and apparatus for issuing, redeeming and authorizing gift certificates that overcomes the shortcomings associated with the related art. The present invention addresses such problems by providing an apparatus and processing approach that have not previously been proposed.

SUMMARY OF THE INVENTION

The present invention provides a method and apparatus for redeeming a gift certificate drawn on a credit card or other financial account. A first aspect of the present invention is directed toward a merchant card authorization terminal. According to this first aspect, the present invention includes the step of receiving a gift certificate for payment of an identified value. The gift certificate, which is issued by an account issuer, includes thereon a certificate identifier corresponding to an account identifier. The account identifier identifies the financial account from which funds will be drawn to support the gift certificate transaction.

The method of redeeming a gift certificate at a merchant card authorization terminal further includes the step of transmitting a request for authorization, including the certificate identifier, to a central server. The merchant card authorization terminal then receives an authorization code from the central server. The received authorization code represents an indication that redemption of the gift certificate for the identified value is authorized. The method also includes receiving a payment from the account issuer based on said identified value of the gift certificate.

A second aspect of the present invention is directed toward a credit card issuer central controller. According to the second aspect of the present invention, a method is disclosed for authorizing the redemption of a gift certificate drawn on a credit card or other financial account. The method includes the step of receiving a request to authorize redemption of a gift certificate for an identified value. The request includes a certificate identifier. The method further includes the steps of determining an account identifier based on the certificate identifier, and accessing stored account data associated with the account identifier.

According to the second aspect of the present invention, the method also includes the step of analyzing the account data to determine whether to authorize the redemption of the identified gift certificate. An authorization code is then transmitted to a remote terminal. The authorization code represents an indication that redemption of the identified gift certificate is authorized. The method still further includes the step of updating the account data to reflect redemption of the identified gift certificate for the identified value.

An apparatus is also disclosed and claimed to implement the methods of the present invention.

It is an object of the present invention to provide a method and apparatus for more securely redeeming gift certificates associated with a credit card or other financial account. Another object of the present invention is to provide a method and apparatus for issuing and redeeming gift certificates utilizing a secure alias account identifier. The above object and other objects, features and advantages are readily apparent from the detailed description when taken in connection with the accompanying drawings.

BRIEF DESCRIPTION OF THE DRAWINGS

A more complete appreciation of the invention and many of the attendant advantages thereof may be readily obtained by reference to the following detailed description when considered with the accompanying drawings, wherein:

FIG. 5 is a table illustrating the record structure of the certificate table depicted in FIG. 2;

FIG. 6 is a table illustrating the record structure of the transaction table depicted in FIG. 2;

FIG. 7 is a table illustrating the record structure of the transaction request table depicted in FIG. 3;

DETAILED DESCRIPTION

Figure 1:
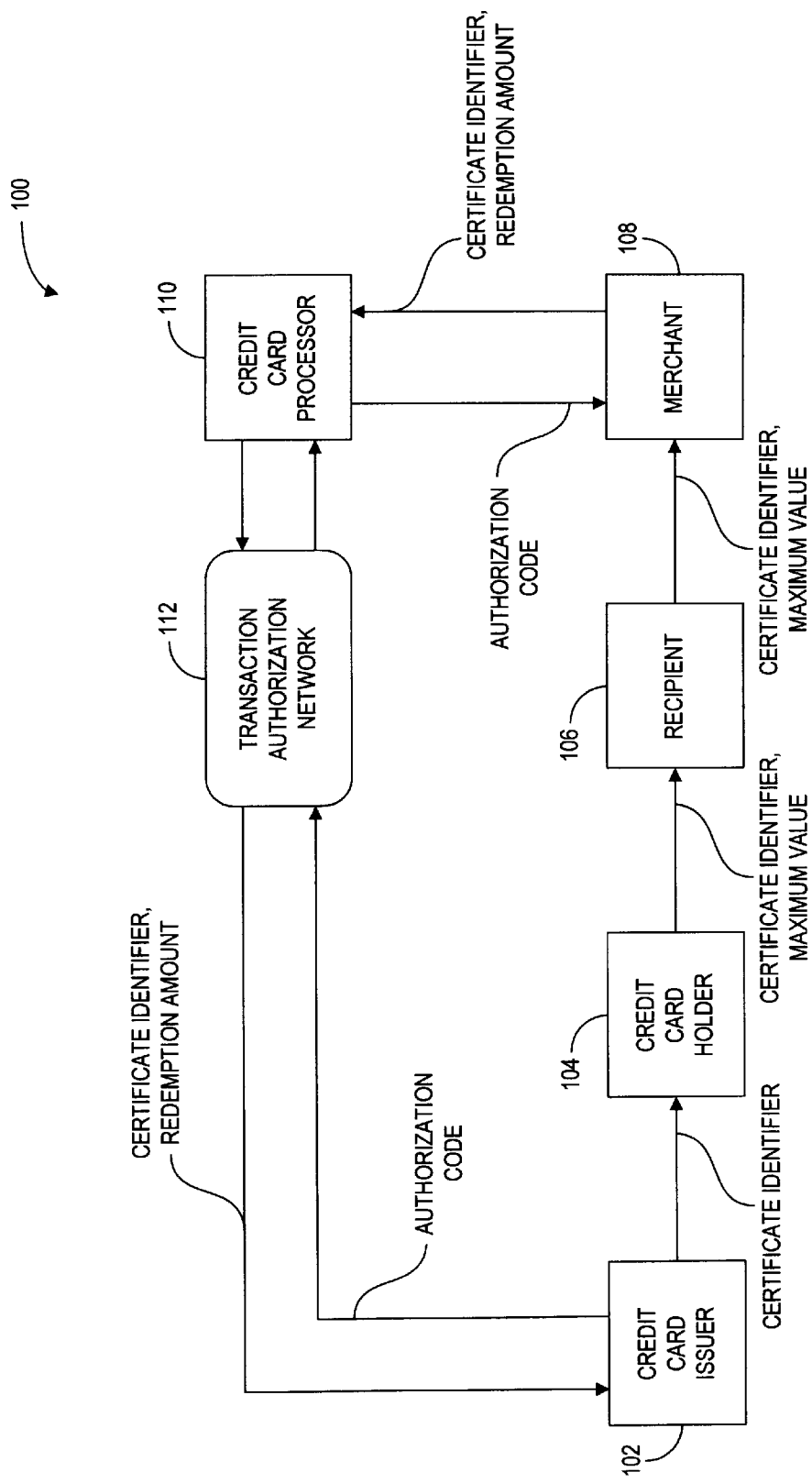
FIG. 1 is a schematic block diagram illustrating the general information flow between parties according to a first embodiment of the present invention.

A first embodiment of the method and apparatus of the present invention will now be discussed with reference to FIGS. 1–10B. Referring to FIG. 1, the general information flow between parties according to a first embodiment of the present invention is depicted in schematic block diagram format.

As illustrated by system 100, in the first embodiment of the present invention, a credit card issuer 102 produces a gift certificate associated with a credit card account. According to the present invention, a gift certificate may be any instrument or token which represents financial value, including a traditional paper certificate, a stored value card, or a magnetic stripe card having an alias account number thereon. Credit card issuer 102 may be a bank or other entity having the sub-systems necessary to issue and maintain general purpose credit/debit accounts. Credit card issuer 102 assigns a corresponding certificate identifier which may be used to identify the certificate and the associated credit card account. Accordingly, the certificate identifier is an alias identifier which provides an indirect link to the credit card account of credit card holder 104. Preferably, the gift certificate identifier is a sixteen digit numeric value, which has not been previously assigned to an existing credit card account, so as to be compatible with conventional credit card transaction processing systems. The gift certificate, including the certificate identifier, is distributed to credit card holder 104, the party responsible for the account.

According to the first embodiment, credit card holder 104 determines a maximum value for the certificate and transfers the certificate, including the certificate identifier and an indication of the maximum value, to recipient 106. Recipient 106 may then present the gift certificate to pay for goods and/or services at participating merchants, such as merchant 108. A participating merchant is one that is capable of processing credit card transactions on behalf of the credit card issuer designated on the gift certificate, such as gift certificate 820 more fully described with reference to FIG. 8. Upon presentation of the gift certificate, merchant 108 verifies the authenticity of the gift certificate via credit card processor 110.

To verify the authenticity of the gift certificate, merchant 108 transmits the certificate identifier and a redemption amount to credit card processor 110. Such transmission may be accomplished using a conventional telecommunications link and a card authorization terminal ("CAT") such as a VeriFone model OMNI® 490. Credit card processor 110, such as First Data Corp., acting as a commercial clearing house for credit card transactions, receives the data and forwards the data to credit card issuer 102. Credit card issuer 102 determines whether the gift certificate identifier is valid and whether the associated credit card account has sufficient available credit to honor the gift certificate. If the received data indicates that the gift certificate is not authentic or that the credit card account cannot support the redemption amount, credit card issuer 102 transmits an authorization code indicating that the transaction is declined to credit card processor 110. Otherwise, credit card issuer 102 transmits an authorization code indicating that the transaction is approved to credit card processor 110. In either event, credit card processor 110 forwards the authorization code to merchant 108 for completion of the transaction.

Figure 2:
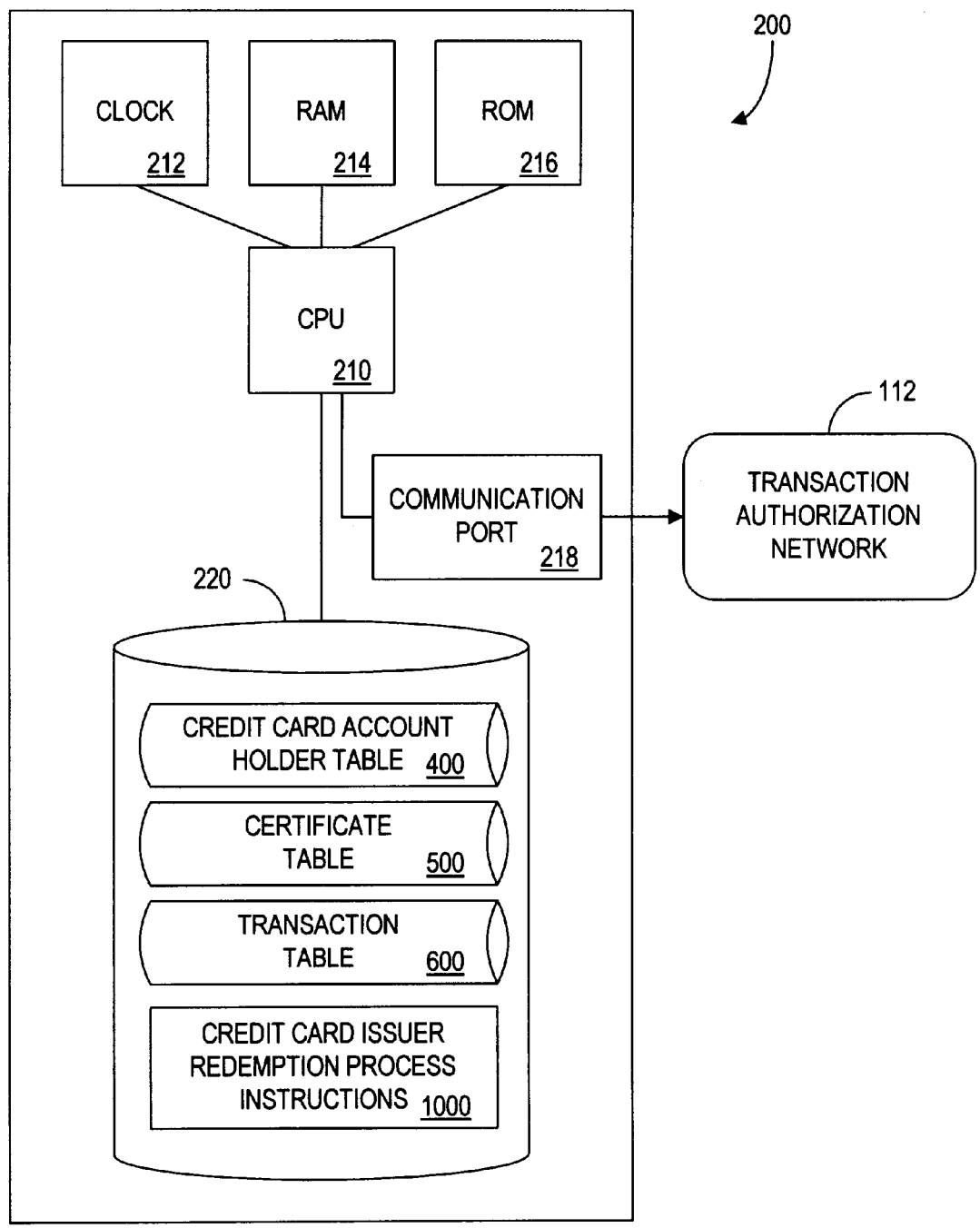
FIG. 2 is a schematic block diagram of a credit card issuer's data processing system.

Referring now to FIG. 2, an exemplary credit card issuer central controller ("CCI") 200 is illustrated. CCI 200 could be any conventional programmable digital computer having sufficient processing power, data storage, and communications facilities to accomplish the data processing tasks typically required of a credit card issuer. As shown, CCI 200 generally includes a central processing unit ("CPU") 210, a clock 212, a random access memory ("RAM") 214, a read only memory ("ROM") 216, a communication port 218, and a data storage device 220. Communication port 218 provides a connection between CCI 200 and transaction authorization network 112 allowing communication between CCI 200 and transaction authorization network 112.

As shown in FIG. 2, storage device 220 stores a database of account, certificate and transaction data, including a credit card holder account table 400, a certificate table 500 and a transaction table 600. Tables 400, 500 and 600 comprise at least a portion of the database stored by storage device 220 and are described more fully with reference to FIGS. 4–6 respectively. Storage device 220 further stores instructions for performing credit card issuer redemption process 1000. Storage device 220 is preferably a magnetic disk drive, but could be a CD-ROM drive, optical disk drive, RAM drive or any other conventional data storage device.

Figure 3:
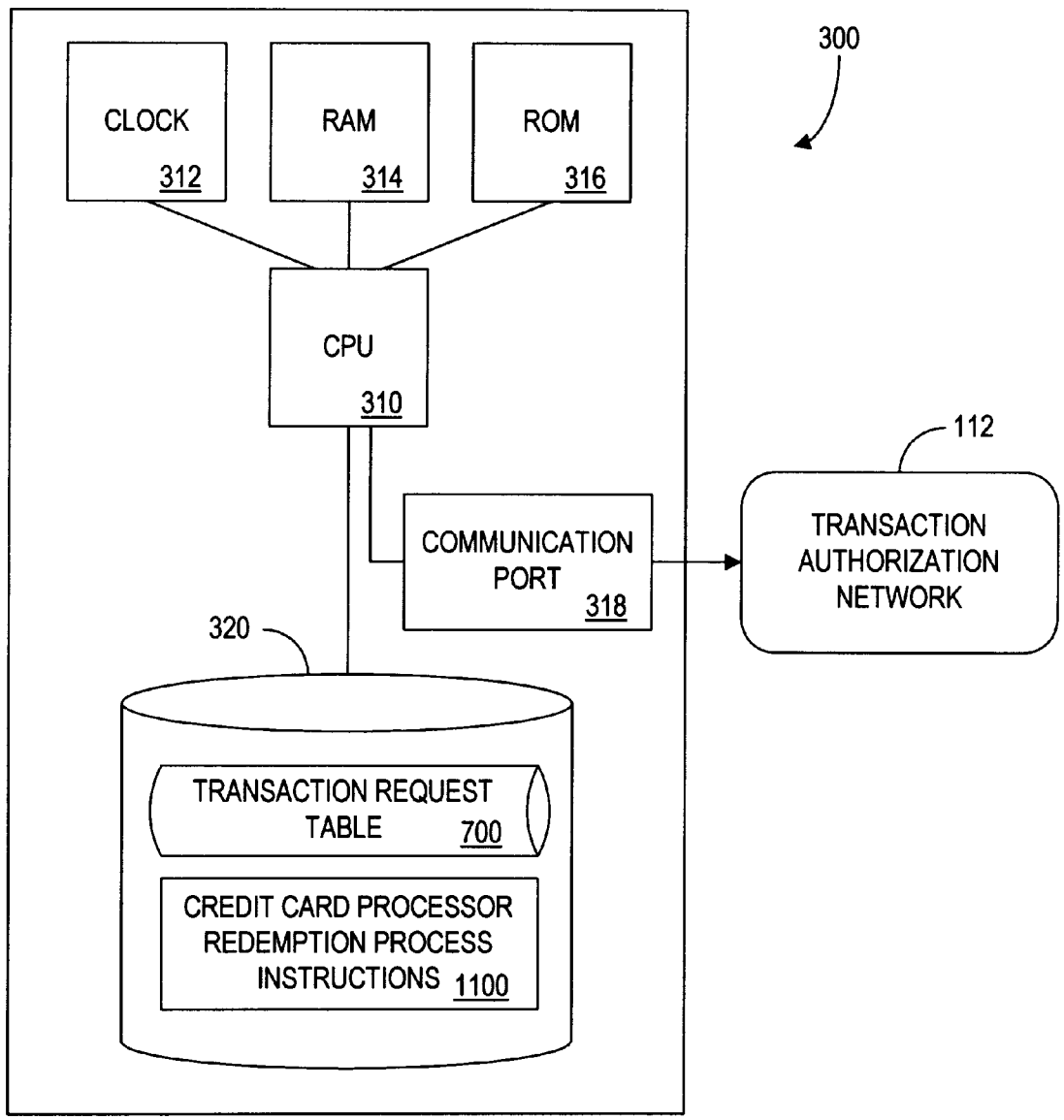
FIG. 3 is a schematic block diagram of a credit card processor's data processing system.

Referring now to FIG. 3, an exemplary credit card processor central controller ("CCP") 300 is illustrated. CCP 300 could be any conventional programmable digital computer having sufficient processing power, data storage and communications facilities to accomplish the data processing tasks typically required of a credit card processor. As shown, CCP 300 generally includes a central processing unit ("CPU") 310, a clock 312, a random access memory ("RAM") 314, a read only memory ("ROM") 316, a communication port 318, and a storage device 320. Communication port 318 provides a connection between CCP 300 and transaction authorization network 112, allowing communication between CCP 300 and transaction authorization network 112. CCP 300 also includes storage device 320 for storing a transaction request table 700 which is described more fully with reference to FIG. 7. Storage device 320 further stores instructions for processing credit card processor redemption process 1100. Storage device 320 is preferably a magnetic disk drive, but could be a CD-ROM drive, optical disk drive, RAM drive, or any other conventional data storage device.

Data Tables

Figure 4:
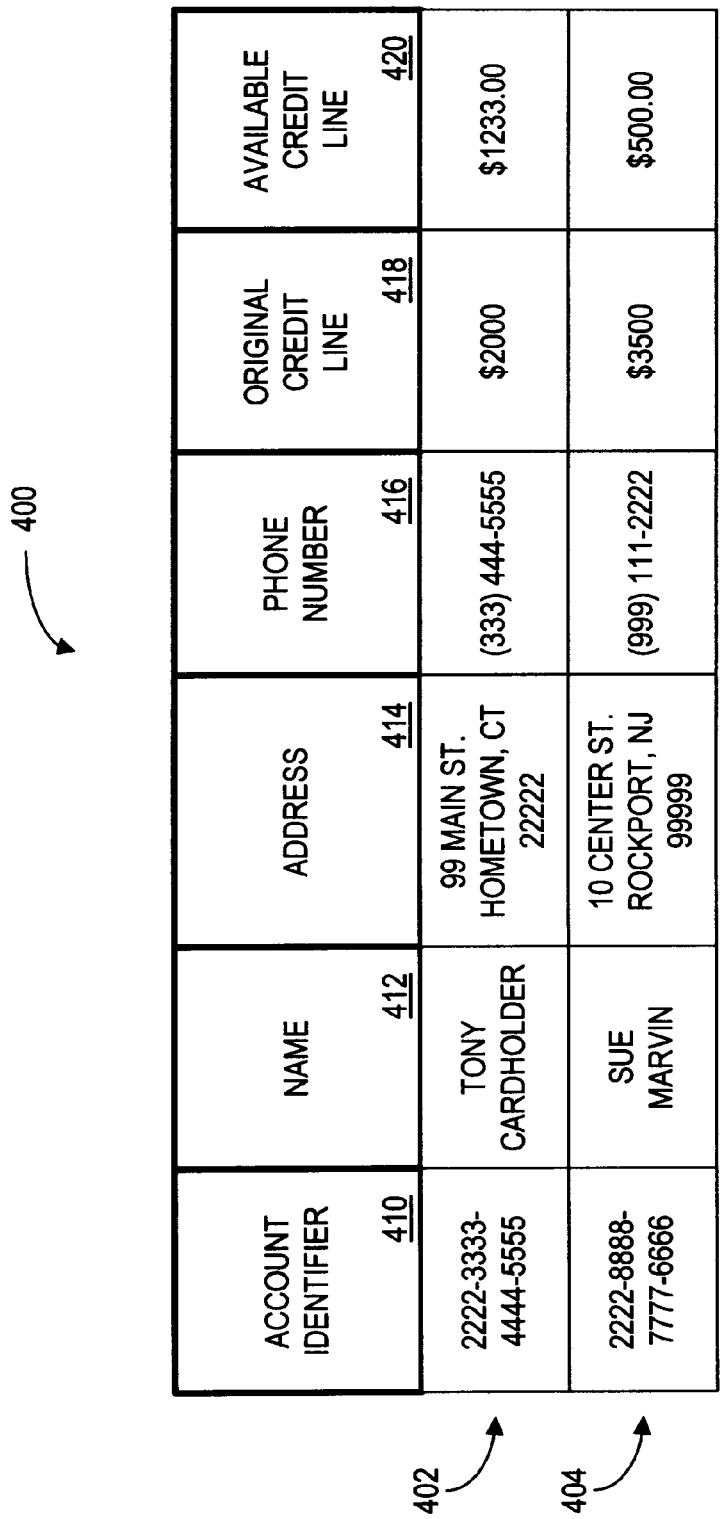
FIG. 4 is a table illustrating the record structure of the credit card account table depicted in FIG. 2.

FIG. 4 illustrates the contents of credit card holder account table 400 in tabular format. Each record of account table 400 includes, but is not limited to, seven information elements representing information pertaining to a card holder account.

Account identifier field 410 stores a unique account identifier. Account identifier field 410 is assigned by the credit card issuer to uniquely identify an account of a card holder. In the present embodiment, the unique account identifier will be a standard 16 digit credit card account number, although more or fewer digits may be used.

Card holder name element 412 stores the name of a card holder 104 who is primarily associated with the account described by the account table record. Card holder name element may be a single field, but will more likely be a combination of fields, including first name, last name, and middle initial. In the case of joint accounts, more than one name may be stored.

Address element 414 stores the mailing address of the card holder. Although the preferred embodiment shows only one address element, it may be useful to provide multiple address elements to accommodate a home address, a billing address and a business address. Address element 414 may be a single field, but preferably includes a combination of fields, including street, city, state, and postal code.

Telephone number field 416 stores the home telephone number of the card holder 104 responsible for the account. Additional telephone numbers, such as office and facsimile numbers, may also be stored in account table 400.

Original credit line field 418 stores the maximum amount of credit that the credit card issuer has provided to the card holder responsible for the account. Available credit line field 420 stores the amount of unused credit available to the credit card holder responsible for the account.

Referring now to FIG. 5, there is depicted an exemplary certificate table 500 storing information pertaining to the post-paid gift certificates of the present invention. Each record of certificate table 500 defines the parameters of a certificate and provides a link to the account identifier of the credit card or other financial account from which funds will be drawn to back the gift certificate. It should be noted that the present invention is not limited to credit card accounts. The present invention will provide similar benefits and operate effectively in conjunction with other types of financial accounts, such as checking accounts and savings accounts linked to automated teller machine ("ATM") cards. Each record of certificate table 500 includes certificate identifier field 510 which stores the certificate identifier of the certificate associated with the record stored in table 400. Each record of certificate table 500 also includes account identifier field 512 which acts as a pointer to the associated credit card account. Each certificate record further includes maximum value field 514 for storing the maximum value of the certificate. Preferably, the contents of field 514 are defined by the credit card holder 104. In an alternate embodiment, credit card issuer 102 may define the contents of field 514.

Expiration date field 516 stores the date on which the associated certificate expires; status field 518 stores a code representing the status of the associated certificate; and security code field 520 stores a security code which may be required to authorize a recipient's redemption of the associated certificate. The second embodiment of the present invention employing a security code is described more fully with reference to FIGS. 11–14B. In the second embodiment, the security code must be presented by the person redeeming the corresponding certificate. The security code and the expiration date are set by the credit card issuer in the present embodiment. Alternatively, however, the expiration date and the security code can be set by the credit card holder. In another variation of the second embodiment, the security code set by the credit card holder can be complemented by personal information identifying the intended recipient, such as the recipient's zip code ("06468"), as shown in field 520 of record 504.

In yet another embodiment of the present invention, personalized challenge field 522 and personalized response field 524 may be employed to improve the security of gift certificates. Generally, field 522 stores a challenge which is presented to the recipient of a gift certificate at the time of redemption via the card authorization terminal to verify the identity of the person attempting to redeem the gift certificate. The contents of field 522 may be defined by either the credit card holder or the intended recipient. Similarly, the correct response to the challenge stored in field 522 is stored in field 524. Like the challenge, the response may be defined by either the credit card holder or the intended recipient, allowing the security challenge and response to be personalized.

The remaining field 526 stores the remaining number of times the gift certificate may be used. Field 526 will be initially populated with "1" for a record corresponding to a single use gift certificate. For a multiple use gift certificate, field 526 may be populated with a code indicating the multiple use nature of the corresponding gift certificate. Value remaining field 528 stores the remaining value for which the gift certificate may be redeemed. Prior to redeeming the corresponding gift certificate, the contents of value remaining field 528 will equal the contents of maximum value field 514. One of ordinary skill in the art will realize that variations and combinations of fields 526 and 528 may be implemented.

Certificate table 500 contains three records: 502, 504 and 506. Record 502 represents a single-use gift certificate payable up to $50.00 which was redeemed for $47.54. Record 504 represents a gift certificate of unlimited number of uses up to a total of $100.00. Record 506 represents a multiple-use gift certificate for up to $50.00. According to record 506, the gift certificate has been redeemed at least once for a total of $47.95 leaving a remaining value of $2.05.

Referring now to FIG. 6, an exemplary transaction table stored by CCI 200 is illustrated in tabular format. Each record of transaction table 600 stores information pertaining to a transaction conducted utilizing a credit card account. Account/certificate identifier field 610 stores an identifier which indicates the account from which funds will be drawn to support the transaction. For records corresponding to traditional credit card transactions, such as records 604 and 606, account/certificate identifier field 610 stores a credit card or other financial account identifier. For records corresponding to transactions supported by a redeemed gift certificate, such as records 602 and 608, account/certificate identifier field 610 stores a certificate identifier which may be used to determine an account identifier.

Date field 612, time field 614 and transaction amount field 620 store data describing the date, time and amount of the transaction, respectively. Reference code field 616 stores data uniquely identifying the transaction, and authorization code field 618 stores the code transmitted to the merchant representing authorization for the transaction.

FIG. 7 depicts an exemplary transaction request table 700 stored by CCP 300. Transaction request table 700 may be used to monitor, audit and control the transaction authorization process. Each record of transaction request table 700 represents a transaction authorization request processed by CCP 300. Transaction authorization request table 700 includes merchant identifier field 710 that stores data identifying the merchant initiating the request to authorize a transaction. Transaction request table 700 also includes date field 712, time field 714, account/certificate identifier field 716 and transaction amount field 718 for storing the date, time, account/certificate identifier and transaction amount, respectively. Table 700 further includes authorization code field 720 for storing the authorization code transmitted to the merchant indicating that the transaction is authorized. If the transaction request is not authorized, the authorization code field may remain unpopulated or may be populated with data representing an unauthorized transaction.

Figure 8:
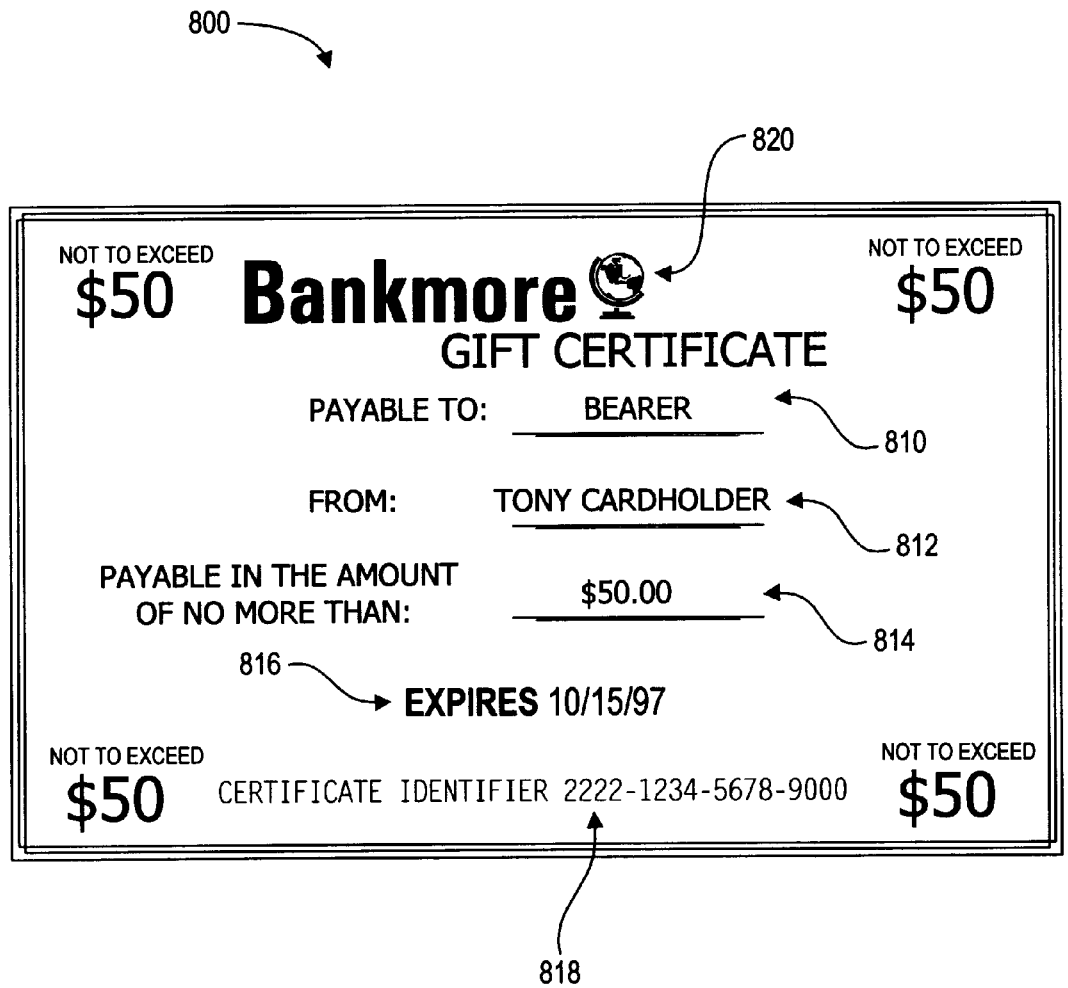
FIG. 8 depicts an exemplary gift certificate having a certificate identifier and additional relevant features.

Referring now to FIG. 8, there is depicted an exemplary gift certificate in accordance with the first embodiment of the present invention. Gift certificate 800 is a single-use financial instrument that may be negotiated by the bearer, as indicated by the example at reference numeral 810. Gift certificate 800 corresponds to record 502 of certificate table 500, and includes the name of the credit card holder 812, a maximum value 814, and an expiration date 816. Gift certificate 800 expires on Jan. 15, 1997 and is redeemable for merchandise worth up to the maximum value, in this case $50.00. Alternatively, gift certificate 800 may be redeemed for $50.00 cash.

Gift certificate 800 further includes a certificate identifier 818 and the name of the credit card issuer 820. The sixteen-digit certificate identifier 818 is, in fact, a corresponding alias account number. There is no way for a person to visually inspect gift certificate 800 to discern the account number belonging to credit card holder 812. The person would only see the certificate identifier (alias account number) and would not have access to the entire available credit line of the credit card holder. The name of the credit card issuer 820 is provided to indicate that the gift certificate is redeemable by any merchant who accepts credit cards from the designated issuer.

Having thus described the system architecture and components of the present embodiment, the operation of the system will now be described in greater detail with reference to FIGS. 9 and 10A–10C with continuing reference to FIGS. 1–8. It is to be understood that the software instructions necessary to provide the functionality described herein are preferably stored in a storage device such as 220 or in a ROM such as 216.

Figure 9:
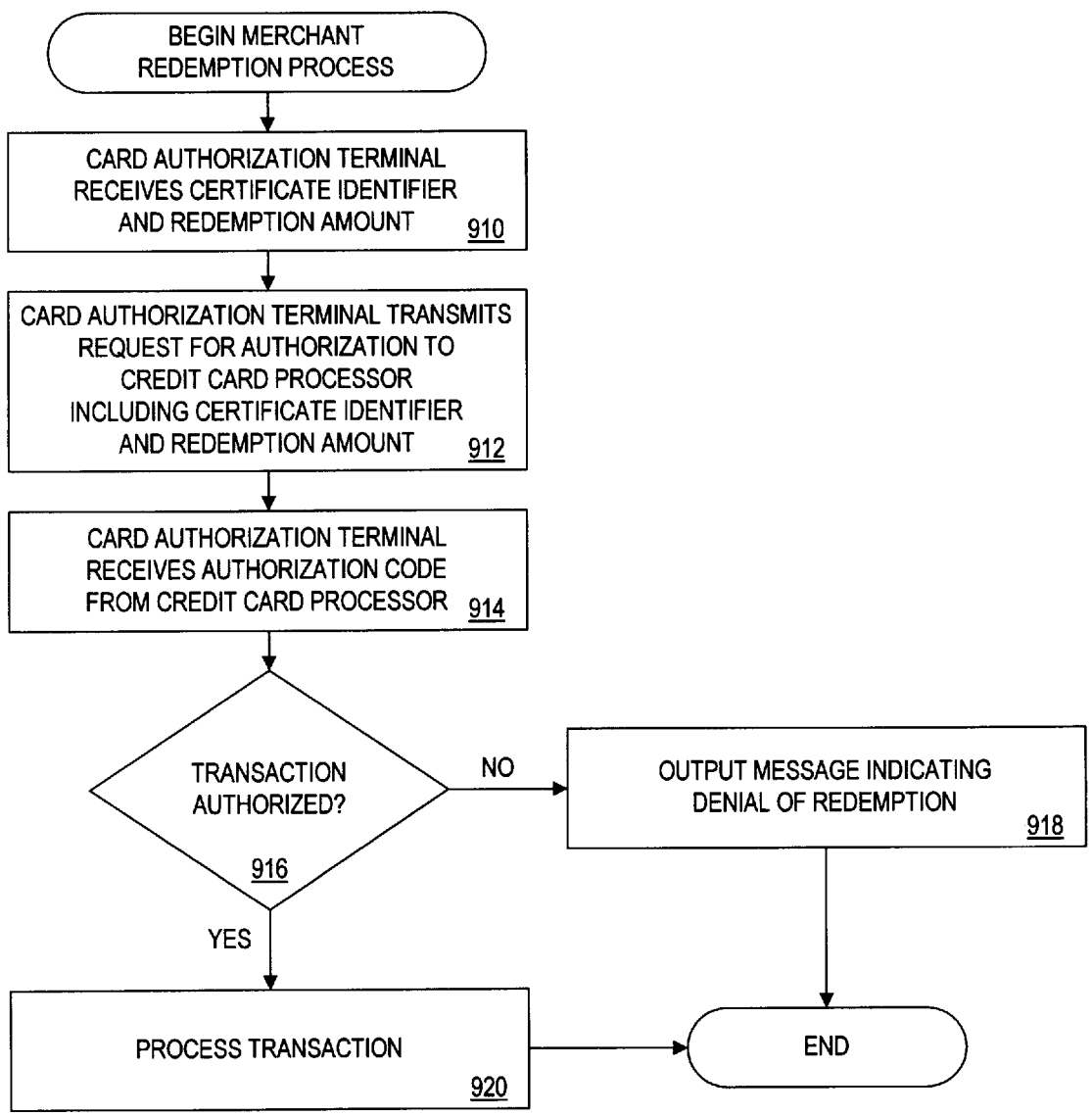
FIG. 9 is a flow chart illustrating the process steps performed by a merchant card authorization terminal during redemption of a gift certificate according to the present invention.

Referring now to FIG. 9, there is illustrated the process steps performed by a merchant when redeeming a gift certificate according to the present invention. Although the merchant may perform these steps manually, they are preferably performed with the aid of a networked card authorization terminal.

According to the redemption process, the merchant receives a gift certificate as payment for goods or services. Upon the merchant's receipt of the gift certificate, the card authorization terminal of the merchant, as shown at step 910, reads the certificate identifier and determines the redemption amount. As previously indicated, the certificate identifier is preferably printed on the certificate for easy reading by a merchant, but the certificate identifier could easily be included on a paper certificate in machine readable form through the use of bar codes, magnetic stripes or "MICR" type face. If the certificate is embodied in a magnetic stripe card or stored value card, the certificate identifier and other information can be stored and read using the magnetic stripe or other data storage device such as RAM.

The redemption amount is determined based on the face value of the certificate and the value of the goods and/or services to be purchased. If the face value of the gift certificate is less than or equal to the value of the goods and/or services to be purchased, the redemption amount equals the face value of the gift certificate. If the face value of the gift certificate is greater than the value of the goods and/or services to be purchased, the redemption amount may be set equal to either the face value of the gift certificate or the value of the goods and/or services to be purchased, possibly depending on whether the gift certificate is a single-use gift certificate or a gift certificate which may be partially used, such as a stored value card. As shown at step 912, the card authorization terminal then transmits a request for authorization, including the certificate identifier and the redemption amount, to CCP 300.

At step 914, the card authorization terminal receives an authorization code from CCP 300 indicating whether the transaction is authorized. As illustrated by decision step 916, if the transaction is authorized, the card authorization terminal processes the gift certificate transaction at step 920. If the received authorization signal indicates that the transaction is not authorized, the card authorization terminal denies redemption of the gift certificate according to step 918.

Figure 10A:
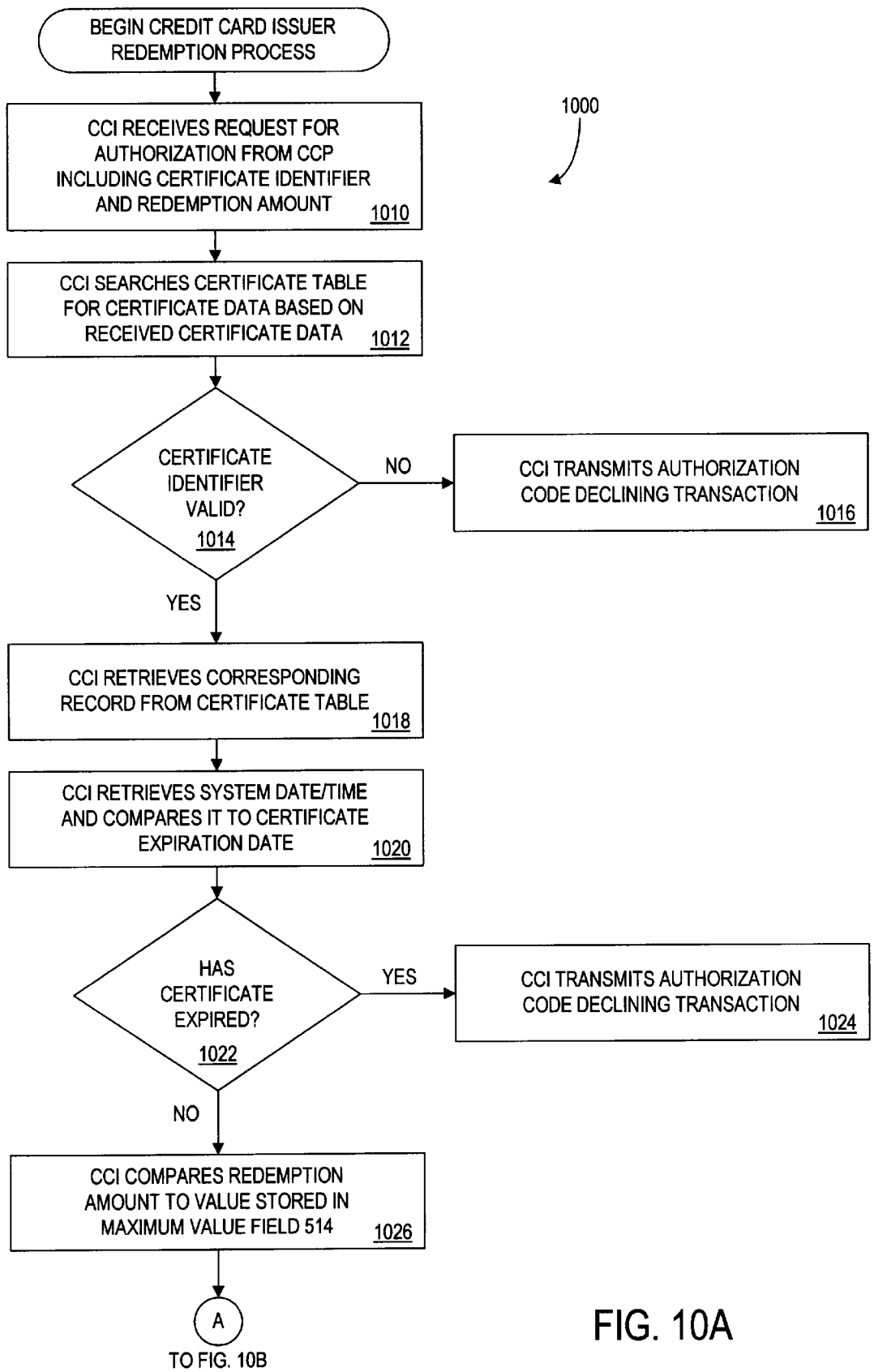
FIGS. 10A–10B is a flow chart illustrating the process steps performed by a credit card issuer central controller during redemption of a gift certificate according to the present invention.
Figure 10B:
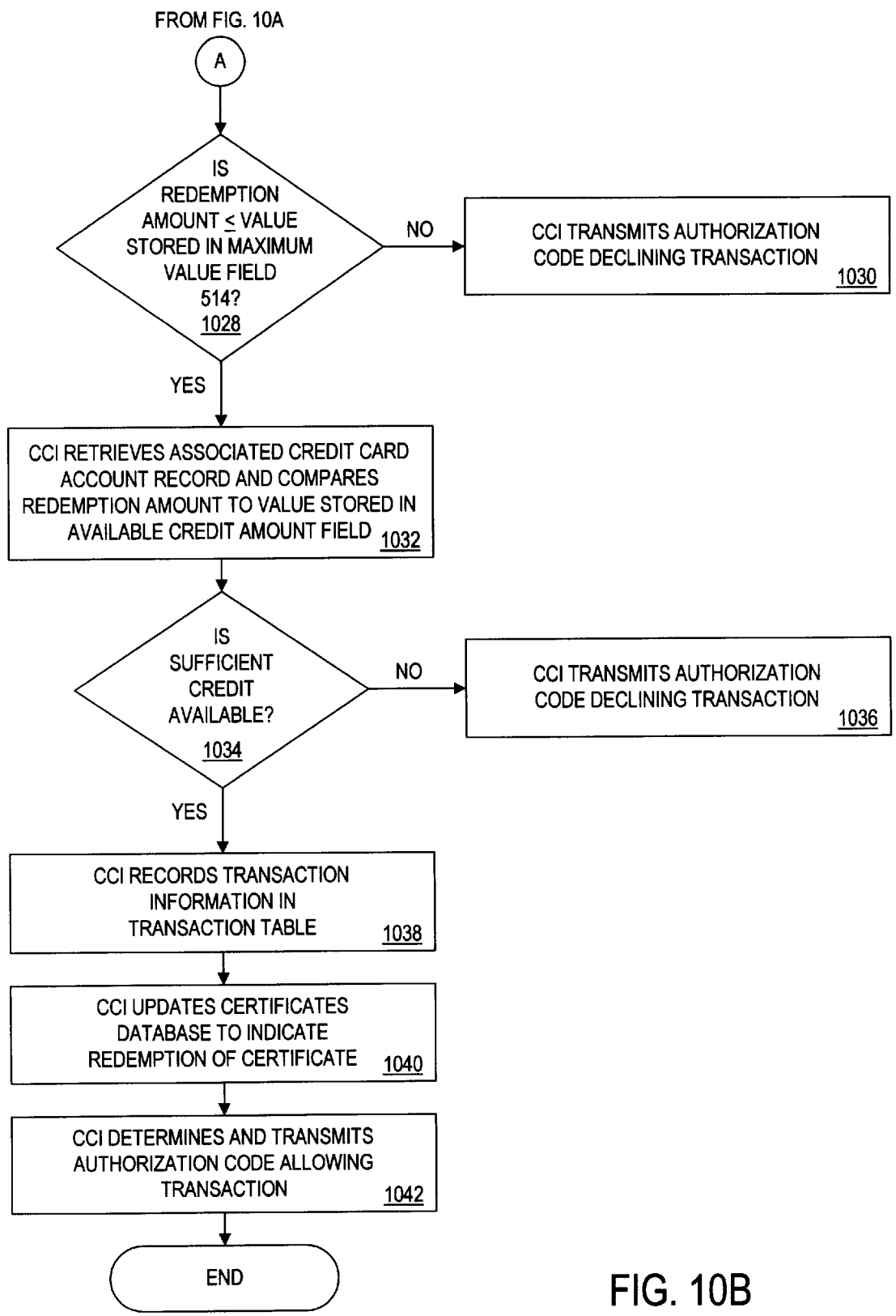

Referring now to FIGS. 10A–10C, there are illustrated the instructions 1000, or process steps performed by CCI 200 when authorizing a redemption of a gift certificate in accordance with the present invention. At step 1010, CCI 200 receives a request for authorization of a gift certificate. The request for authorization originates with the merchant and is routed through CCP 300. The request for authorization includes the certificate identifier and the redemption amount.

At step 1012, CCI 200 searches certificate identifier field 510 of certificate table 500 for relevant certificate data based on the received certificate identifier. CCI 200 then determines if the received certificate identifier is valid, as shown by step 1014. A received certificate identifier is valid if a record having a matching certificate identifier is found and if status field 518 of the record indicates that the certificate is "active." If CCI 200 determines that the received certificate identifier is not valid, CCI 200 transmits an authorization code declining the transaction, as shown by step 1016. If CCI 200 determines that the received certificate identifier is valid, CCI 200 retrieves the corresponding record from certificate table 500 at step 1018.

As shown by steps 1020–1022, CCI 200 then retrieves the system date/time and compares it to the certificate expiration date stored in field 516 and determines whether the gift certificate bearing the certificate identifier has expired. If the gift certificate has expired, CCI 200 performs step 1024 and transmits an authorization code declining the redemption of the identified gift certificate. Otherwise, CCI 200 performs step 1026 and compares the received redemption amount to the value stored in maximum value field 514. According to step 1028, if the redemption amount is greater than the value stored in field 514, CCI 200 performs step 1030 and transmits an authorization code declining the redemption of the gift certificate. If the redemption value is less than or equal to the maximum value of the gift certificate, CCI 200 retrieves the associated credit card account record from table 400 and compares the redemption value to the amount stored in available credit line field 420.

If sufficient credit is not available, CCI 200 transmits an authorization code declining the transaction, as shown by steps 1034 and 1036. If sufficient credit is available, CCI 200 processes step 1038 and records transaction information in transaction table 600. CCI 200 then updates status field 518 of the relevant record of certificate table 500 to indicate redemption of the certificate and transmits an authorization code allowing the gift certificate redemption, as shown by steps 1040 and 1042.

Security Code Embodiment

Figure 11:
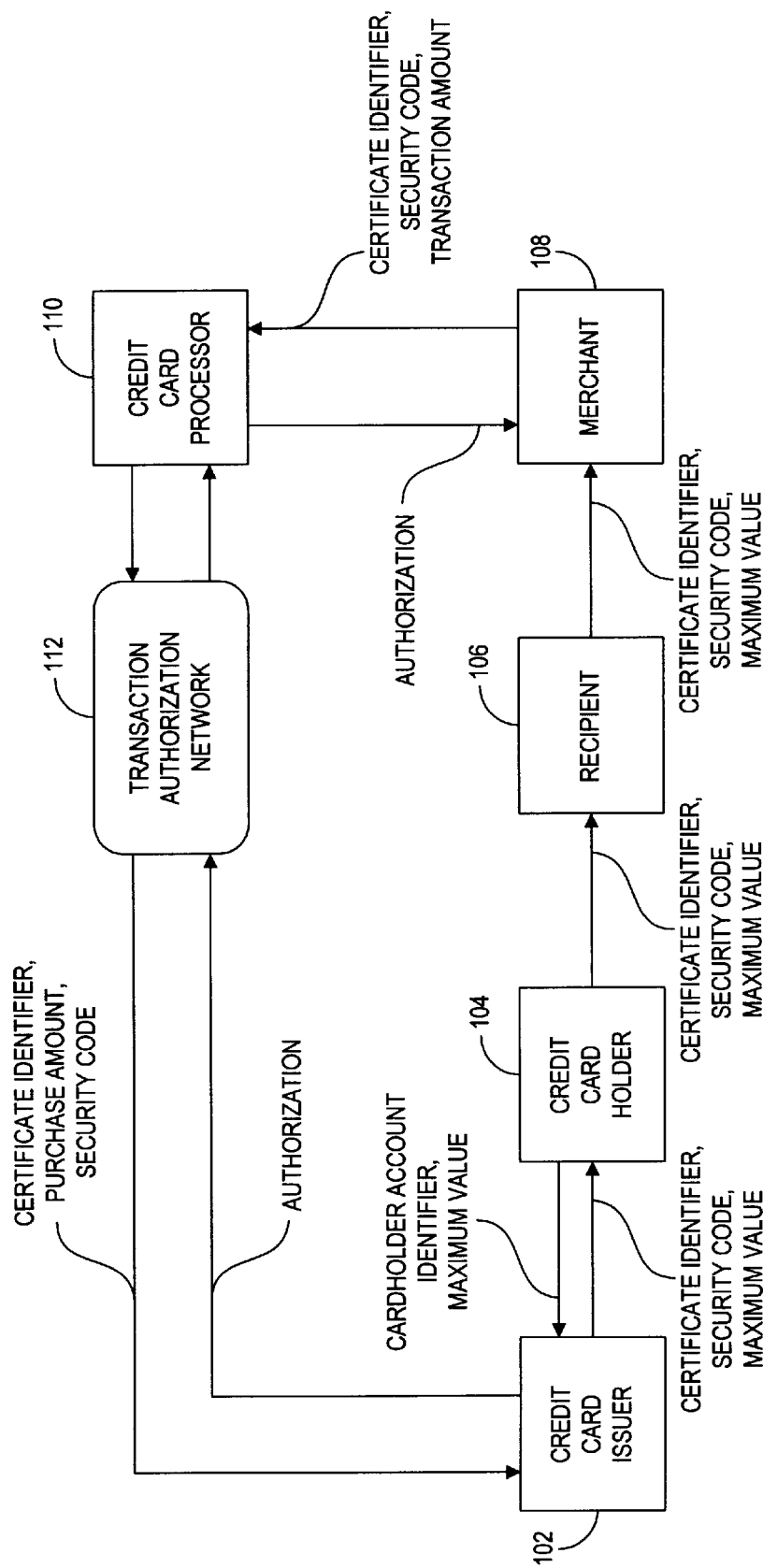
FIG. 11 is a schematic block diagram illustrating the general information flow between parties according to a second embodiment of the present invention.

An alternate embodiment of the method and apparatus of the present invention will now be discussed with reference to FIGS. 11–14B. Referring to FIG. 11, the general information flow between parties according to the alternate embodiment of the present invention is depicted in schematic block diagram format.

System 1100 depicted in FIG. 11 is similar to system 100 depicted in FIG. 1. A significant difference between systems 100 and 1100 is that in system 1100, credit card holder 104 transmits a gift certificate request to credit card issuer 102 instead of simply receiving an unsolicited bearer certificate. The gift certificate request depicted in FIG. 11 includes the card holder account identifier and a maximum value. Of course, the credit card holder could optionally specify the recipient, the number of times the certificate may be used, the address of the recipient, or other information defining the characteristics of the gift certificate. In response, credit card issuer 102 produces a gift certificate associated with data received from credit card holder 104. As previously described with reference to system 100, credit card issuer 102 assigns a corresponding certificate identifier which may be used to identify the certificate and the associated credit card account. Credit card issuer then distributes a security code and the gift certificate, including the certificate identifier, to credit card holder 104, the party responsible for the account.

Credit card holder 104 then transfers the gift certificate, including the certificate identifier and an indication of the maximum value, to recipient 106. In addition, credit card holder 104 transmits the security code to recipient 106. Of course, the distribution of the gift certificate and security code could occur in other ways. For example, if credit card holder 104 provided credit card issuer with the address of the recipient, credit card issuer could distribute both the gift certificate and the security code directly to the recipient. Preferably, credit card issuer 102 would separate the gift certificate and security code and stagger the delivery of the two items to improve security.

Upon receiving both the gift certificate and the security code, recipient 106 may then present the gift certificate to pay for goods and/or services at participating merchants, such as merchant 108. Upon presentment of the gift certificate, merchant 108 requests and receives the security code from recipient 106. As in system 100, merchant 108 verifies the authenticity of the gift certificate via credit card processor 110.

To verify the authenticity of the gift certificate, merchant 108 transmits the certificate identifier, the security code received from recipient 106 and a redemption amount to credit card processor 110. Credit card processor receives the data and forwards the data to credit card issuer 102. Credit card issuer 102 determines whether the gift certificate identifier is valid, whether the associated credit card account has sufficient available credit to honor the gift certificate and whether the security code received from merchant 108 matches the stored security code associated with the certificate identifier. As in system 100, credit card issuer 102 transmits an authorization code to credit card processor 110, indicating that the transaction is declined or approved. In either event, credit card processor 110 forwards the authorization code to merchant 108 for completion of the transaction.

Figure 12:
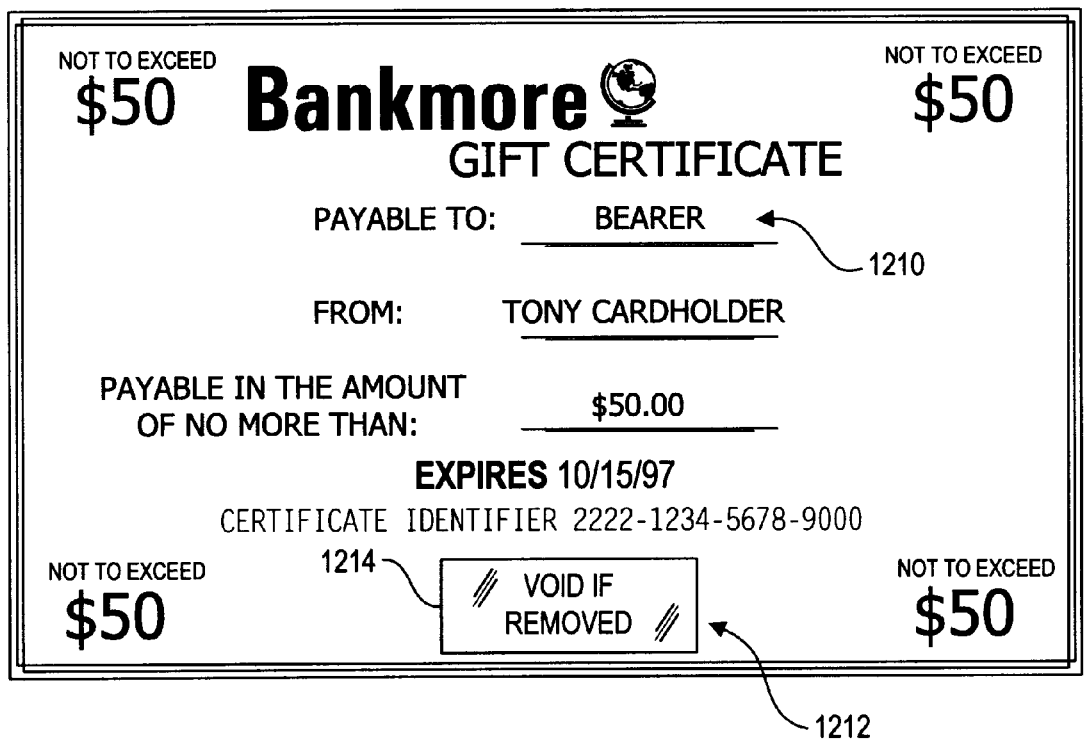
FIG. 12 depicts a second exemplary gift certificate having visually obscured security code for use with the system shown in FIG. 11.

In addition to the previously described embodiments of the gift certificate of the present invention, the gift certificate may take the form of a card or ticket 1200 as depicted in FIG. 12. Card 1200 includes many of the same elements as gift certificate 800, but further includes payee identification 1210 and verification element 1212. Payee identification 1210 indicates the name of the person authorized to redeem the certificate, such as recipient 106. Verification element 1212 is used to independently verify that recipient 106 is authorized to redeem certificate 1200. Verification element includes a removable covering 1214 visually obscuring a portion of card 1200. The scratch-off or otherwise removable covering is preferably a latex coating applied over an area of card 1200 on which the security code is printed. In this embodiment, the authenticity of the security code provided by recipient 106 could be independently verified by merchant 108, who would remove the covering to confirm that the recipient provided the correct security code. The independent verification could be employed in place of, or in addition to, verification by credit card issuer 102. If removable covering 1214 is removed prior to presentation of the gift certificate, or if the bearer does not present the correct security code, the gift certificate may be voided as a security measure.

Figure 13:
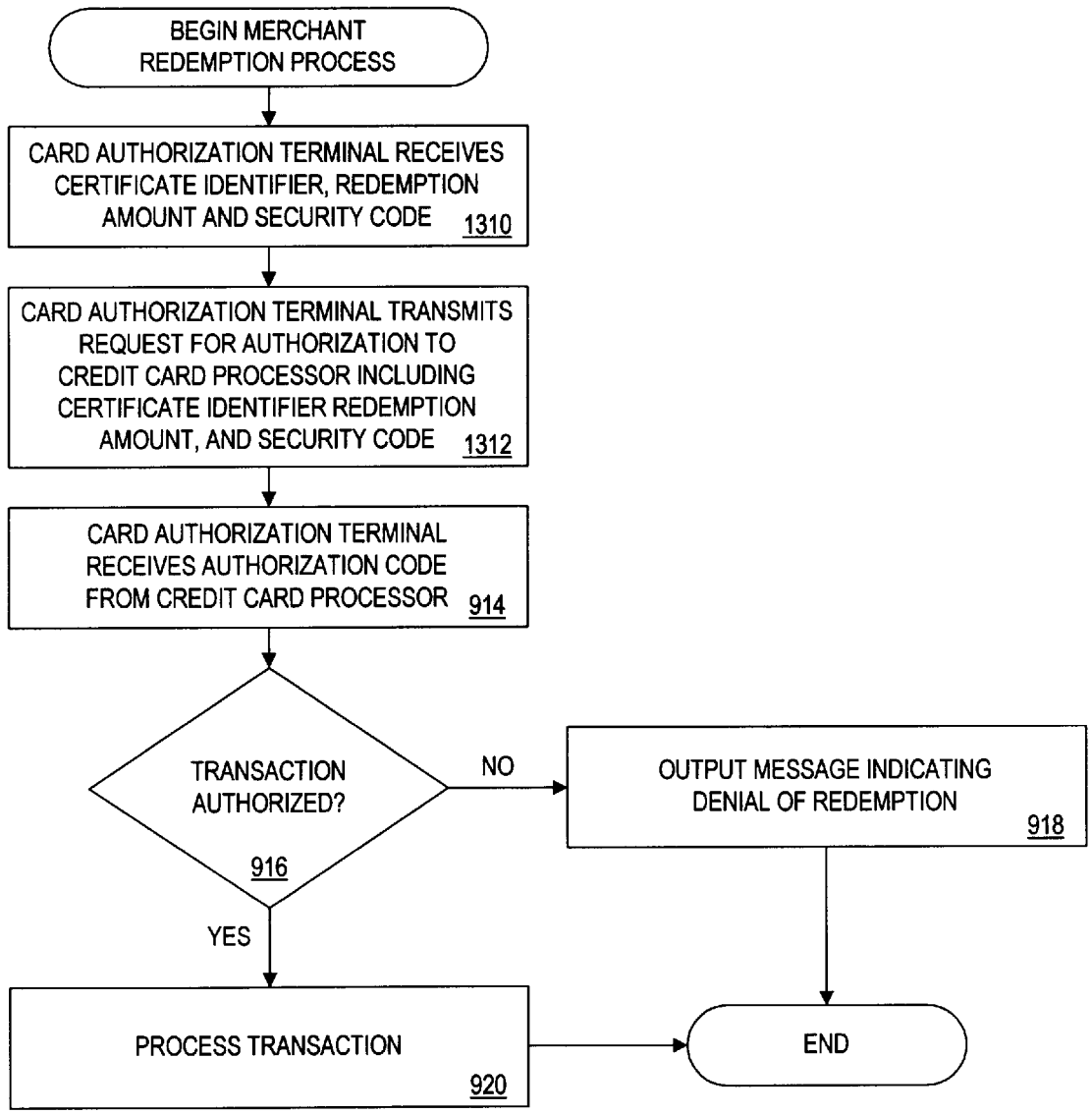
FIG. 13 is a flow chart illustrating the process steps performed by a merchant card authorization terminal during redemption of a gift certificate according to the second embodiment of the present invention.

Referring now to FIG. 13, there is illustrated the process steps performed by a merchant, when redeeming a gift certificate according to the embodiment of the present invention employing a security code. At step 1310, the card authorization terminal, or merchant 108 if the process is performed manually, receives a certificate identifier, redemption amount, and security code. At step 1312, the card authorization terminal transmits a request for authorization to CCP 300. The request for authorization includes the certificate identifier, redemption amount and security code.

At step 1314, the card authorization terminal determines whether the authenticity of the recipient should be locally verified. This may be accomplished by receiving a signal from the card authorization terminal operator, by sensing the presence of a scratch-off area of the gift certificate or by any method known by one of ordinary skill. If the determination of decision step 1314 is positive, the authenticity of the recipient is verified locally. In the case of a gift certificate embodied as a scratch-off card, this is accomplished manually by the merchant who may scratch off the removable latex covering to reveal the security code of the certificate. In the case of a gift certificate embodied as a card with a magnetic stripe, the card authorization terminal compares the security code received from recipient 106 with a security code stored on the magnetic stripe. Steps 916 and 920 of the process are substantially the same as those described with reference to FIG. 9.

Figure 14A:
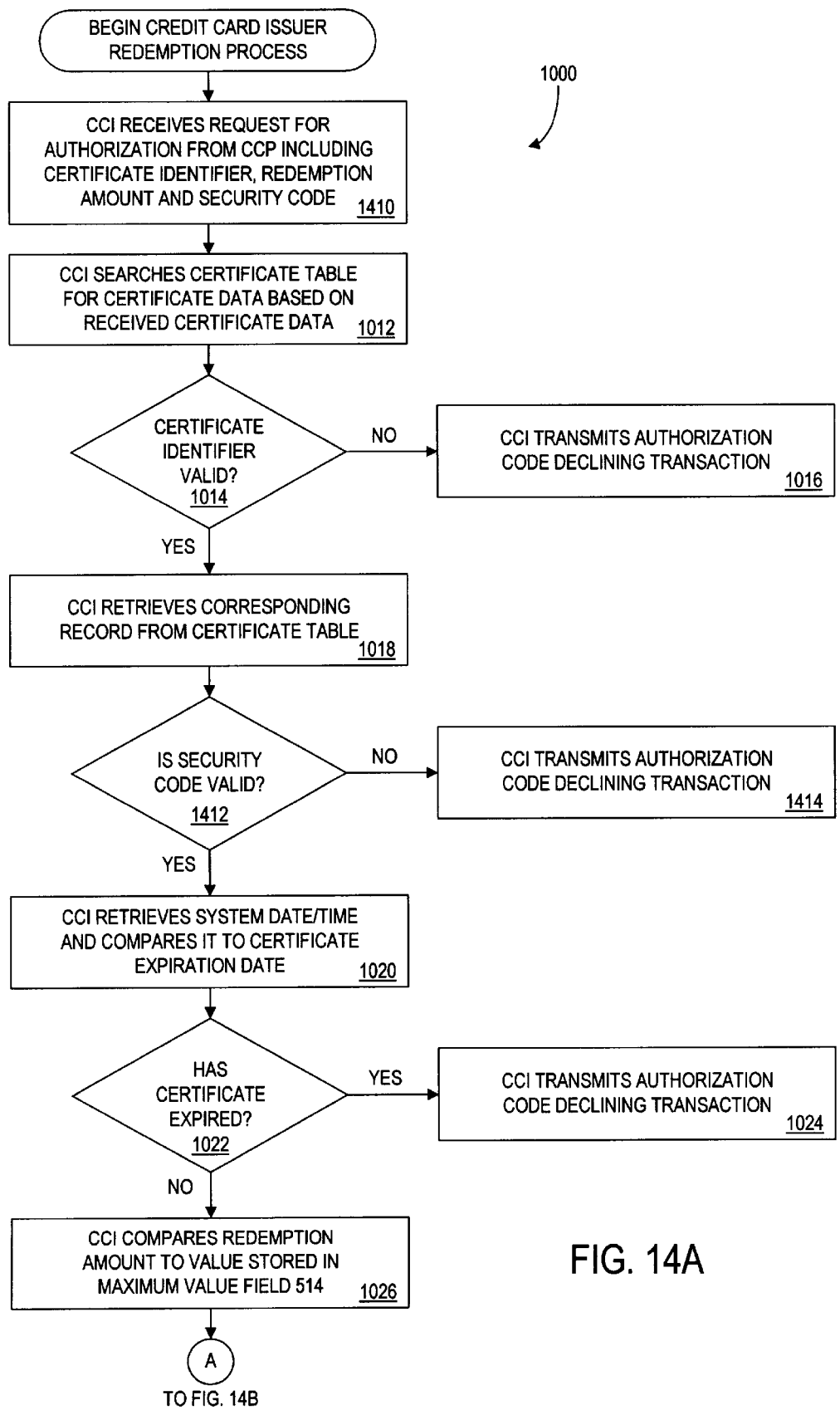
FIGS. 14A–14B is a flow chart illustrating the process steps performed by a credit card issuer central controller during redemption of a gift certificate according to the second embodiment of the present invention.
Figure 14B:
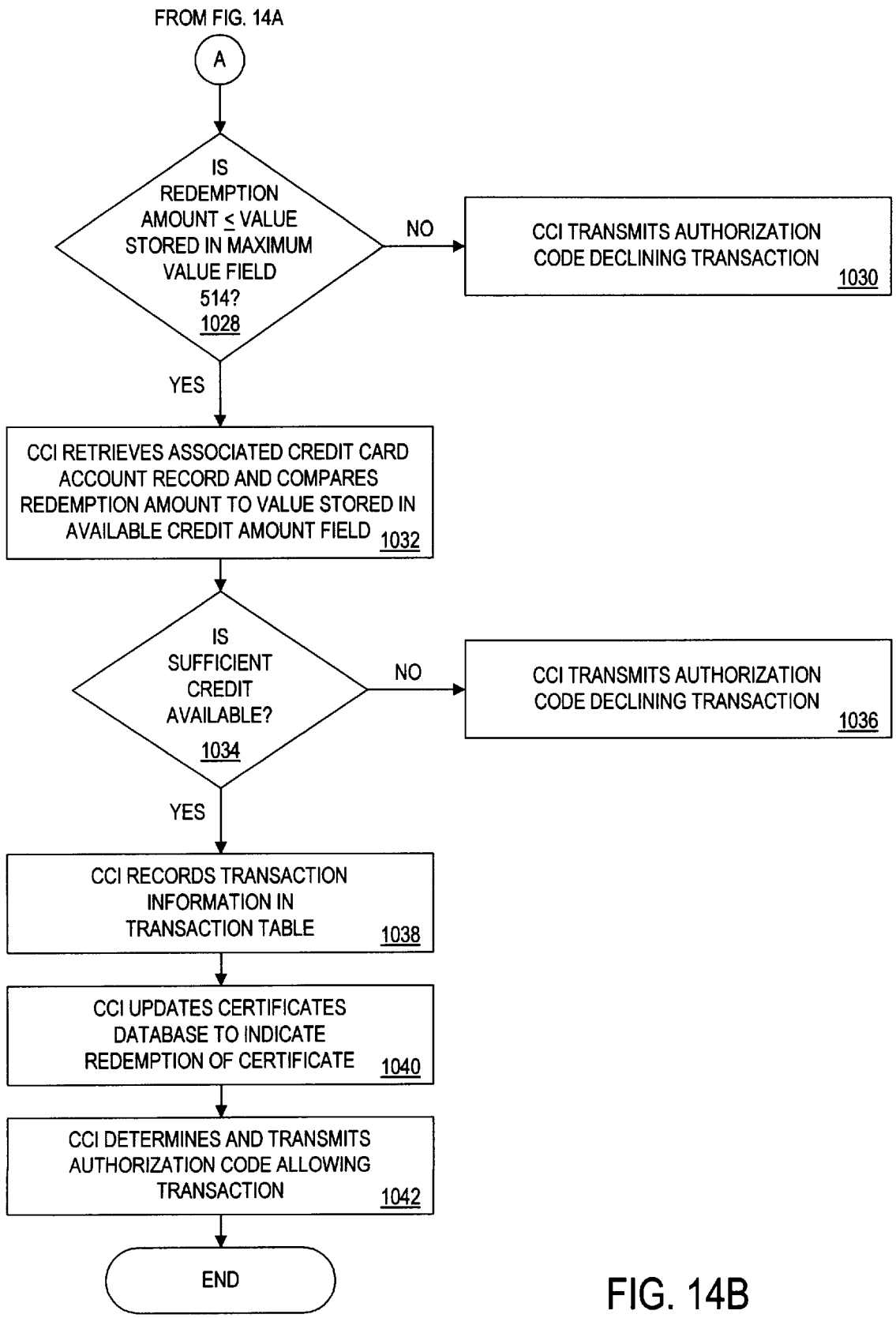

Referring now to FIGS. 14A–14B, there are illustrated the instructions 1000 or process steps performed by CCI 200 when authorizing a redemption of a gift certificate in accordance with the security code embodiment of the present invention. At step 1410, CCI 200 receives a request for authorization of a gift certificate. The request for authorization originates with the merchant and is routed through CCP 300. The request for authorization includes the certificate identifier, the redemption amount and the security code received from recipient 106.

At step 1412, CCI 200 determines whether the security code received from recipient 106 is valid. This is accomplished by comparing the received security code with the security code stored in field 520 of the relevant record from certificate table 500. If CCI 200 determines that the received security code is not valid, CCI 200 transmits an authorization code declining the transaction, as shown by step 1414. If CCI 200 determines that the received security code is valid, CCI 200 continues processing at step 1020. Steps 1012–1042 are performed as described with reference to FIG. 10.

While the best mode for carrying out the invention has been described in detail, those familiar with the art to which the invention relates will recognize various alternative designs and embodiments for practicing the invention. These alternative embodiments are within the scope of the present invention. Accordingly, the scope of the present invention embodies the scope of the claims appended hereto.

What is claimed is:

1. A method for issuing a gift certificate corresponding to a financial account, comprising the steps of:

identifying and accessing stored account data associated with a financial account, said stored data including an account identifier;

determining a certificate identifier corresponding to said account identifier;

producing a gift certificate including thereon said certificate identifier; and distributing said gift certificate to an owner of said financial account.

2. The method of claim 1 wherein said account identifier is linked to said certificate identifier.

3. The method of claim 1 wherein said step of producing a gift certificate includes the step of applying a user-alterable means for obstructing the visibility of said certificate identifier.

4. The method of claim 1 further comprising the steps of:
determining a security code corresponding to said gift certificate;
printing said security code on said gift certificate;
applying a user-alterable means for obstructing the visibility of said printed security code; and
transmitting said security code to said owner of said financial account.

5. The method of claim 1 further comprising the steps of:
determining a security code corresponding to said gift certificate; and
transmitting said security code to said owner of said financial account.

6. The method of claim 5 further comprising the steps of:
producing a security token storing said security code; and
distributing said security token.

7. The method of claim 1 wherein said gift certificate is embodied as a magnetic stripe card.

8. The method of claim 1 wherein said gift certificate is embodied as a token.

9. The method of claim 1 further comprising the steps of:
determining expiration data of said gift certificate; said gift certificate including thereon an indication of said expiration data; and
storing said expiration data, said account data including said expiration data.

10. The method of claim 1 further including the steps of:
determining a maximum redemption value of said gift certificate;
storing said maximum redemption value, said account data including said maximum redemption value.

11. The method of claim 1 further including the steps of:
determining a maximum redemption value of said gift certificate; and
updating said stored account data to reflect a reservation of credit equal to said maximum redemption value.

12. The method of claim 1 wherein said gift certificate includes an issuer identifier representing the issuer of said gift certificate.

13. The method of claim 1 wherein said gift certificate is embodied as an event ticket.

14. A method for redeeming a gift certificate drawn on a financial account, comprising the steps of:
receiving a gift certificate for payment of an identified value, said gift certificate issued by an account issuer and including thereon a certificate identifier corresponding to an account identifier, said account identifier associated with a financial account;
transmitting a request for authorization to a central server, said request including said certificate identifier;
receiving an authorization signal from said central server, said authorization signal representing an indication that redemption of said gift certificate for said identified value is authorized; and
receiving a payment from said account issuer based on said identified value.

15. The method of claim 14 further comprising the steps of:
receiving a security code; and
transmitting said security code to said central server.

16. The method of claim 15 wherein said step of receiving a security code includes the steps of:
receiving a magnetic stripe card having a security code stored thereon; and
reading said security code from said magnetic stripe card.

17. The method of claim 14 wherein said gift certificate is embodied as a magnetic stripe card.

18. The method of claim 14 wherein said gift certificate is embodied as a token.

19. The method of claim 14 further comprising the steps of:
receiving challenge data from said central server;
presenting said challenge data to a bearer of said gift certificate;
receiving response data from said bearer of said gift certificate; and
transmitting said response data to said central server.

20. The method of claim 19 further comprising the step of receiving a challenge-response authorization signal from said central server indicating an association between said challenge data and said response data.

21. The method of claim 19 wherein said response data is unique.

22. The method of claim 19 wherein said challenge data and said response data are user definable.

23. A method for authorizing the redemption of a gift certificate drawn on a financial account, comprising the steps of:
receiving a request to authorize redemption of a gift certificate for an identified value, said request including a certificate identifier;
determining an account identifier based on said certificate identifier;
accessing stored account data associated with said account identifier;
analyzing said account data to determine whether to authorize the redemption of said gift certificate;
transmitting an authorization signal to a remote terminal, said authorization signal representing an indication that redemption of said gift certificate for said identified value is authorized;
updating said account data to reflect redemption of said gift certificate for said identified value.

24. The method of claim 23 further comprising the steps of:
receiving a security code from a remote terminal; and
comparing said received security code to a stored security code.

25. The method of claim 23 wherein said stored account data includes an expiration date, said method further comprising the steps of:
accessing a current date;
comparing said current date to said expiration date of said stored account data to determine whether to authorize the redemption of said gift certificate.

26. A method for utilizing a gift certificate comprising the steps of:
presenting a gift certificate for redemption, said gift certificate including a printed security code and a user-alterable means for obstructing the visibility of said printed code;
providing a security code associated with said gift certificate;
removing said user-alterable means for obscuring the visibility of said printed security code; and
comparing said printed security code with said security code.

27. A computer-readable storage medium encoded with processing instructions for implementing a method for redeeming a gift certificate drawn on a financial account, said processing instructions for directing a computer to perform the steps of:

receiving a gift certificate for payment of an identified value, said gift certificate issued by an account issuer and including thereon a certificate identifier corresponding to an account identifier, said account identifier associated with a financial account;

transmitting a request for authorization to a central server, said request including said certificate identifier;

receiving an authorization signal from said central server, said authorization signal representing an indication that redemption of said gift certificate for said identified value is authorized; and receiving a payment from said account issuer based on said identified value.

28. A computer-readable storage medium encoded with processing instructions for implementing a method for authorizing the redemption of a gift certificate drawn on a financial account, said processing instructions for directing a computer to perform the steps of:

receiving a request to authorize redemption of a gift certificate for an identified value, said request including a certificate identifier;

determining an account identifier based on said certificate identifier;

accessing stored account data associated with said account identifier;

analyzing said account data to determine whether to authorize the redemption of said gift certificate;

transmitting an authorization signal to a remote terminal, said authorization signal representing an indication that redemption of said gift certificate for said identified value is authorized;

updating said account data to reflect redemption of said gift certificate for said identified value.

29. An apparatus for issuing a gift certificate drawn on a financial account, comprising:

a memory for storing account data associated with a financial account, said account data including an account identifier;

an output device for producing a gift certificate; and a processor operatively coupled to said memory and said output device, said processor configured to:
    access said stored account data;
    determine a certificate identifier corresponding to said account identifier; and
    produce a gift certificate including thereon said certificate identifier.

30. The apparatus of claim 29 wherein said account identifier is linked to said certificate identifier.

31. The apparatus of claim 29 wherein said output device is configured to:
    print said certificate identifier on said gift certificate; and
    apply a user-alterable means for obstructing the visibility of said certificate identifier.

32. The apparatus of claim 29 wherein said processor is further configured to determine a security code corresponding to said gift certificate; and said output device is further configured to:
    print said security code on said gift certificate;
    apply a user-alterable means for obstructing the visibility of said printed security code.

33. The apparatus of claim 29 wherein said processor is further configured to:
    determine a security code corresponding to said gift certificate; and transmit said security code to said owner of said financial account.

34. The apparatus of claim 33 wherein said output device is configured to produce a security token storing said security code.

35. The apparatus of claim 29 wherein said processor is further configured to determine expiration data of said gift certificate; said output device is further configured to print an indication of said expiration data on said gift certificate; and said memory is further configured to store said expiration data.

36. The apparatus of claim 29 wherein said processor is further configured to determine a maximum redemption value of said gift certificate; and said memory is further configured to store said maximum redemption value.

37. The apparatus of claim 29 wherein said processor is further configured to:
    determine a maximum redemption value of said gift certificate; and
    update said stored account data to reflect a reservation of credit equal to said maximum redemption value.

38. An apparatus for redeeming a gift certificate drawn on a financial account, comprising:

a memory for storing gift certificate data including a gift certificate identifier;

a first input device for receiving said gift certificate identifier;

an output device for transmitting:
    an authorization request to a central server, said authorization request including said gift certificate identifier and an identified value;

a second input device for receiving an authorization signal from said central server, said authorization signal representing an indication that redemption of said gift certificate for said identified value is authorized; and a processor operatively connected to said memory, said first input device, said output device and said second input device for controlling a redemption process.

39. The apparatus of claim 38 wherein said first input device is further configured to receive a security code; and said output device is further configured to transmit said security code to said central server.

40. The apparatus of claim 39 wherein said first input device is further configured to read said security code from a magnetic stripe card.

41. The apparatus of claim 38 wherein said second input device is further configured to receive challenge data from said central server; said processor is further configured to present said challenge data to a bearer of said gift certificate; said first input device is further configured to receive response data from said bearer of said gift certificate; and said output device is further configured to transmit said response data to said central server.

42. The apparatus of claim 41 wherein said second input device is further configured to receive a challenge-response authorization signal from said central server indicating an association between said challenge data and said response data.

43. An apparatus for authorizing the redemption of a gift certificate drawn on a financial account, comprising:

a memory for storing:
    account data including an associated account identifier and a certificate identifier; and
    a redemption value;

an input device configured to receive a request to authorize a redemption of a gift certificate for said redemption value;

17 a processor configured to:
determine an account identifier based on said certificate identifier;
analyze said account data to determine whether to authorize the redemption of said gift certificate; and
update said account data to reflect redemption of said gift certificate for said redemption value; and
an output device configured to transmit an authorization signal to a remote terminal, said authorization signal representing an indication that redemption of said gift certificate for said identified value is authorized.

44. The apparatus of claim 43 wherein the input device is further configured to receive a security code from a remote terminal; and the processor is further configured to compare said received security code to a stored security code.

45. The apparatus of claim 43 wherein said stored account data includes an expiration date, and said processor is further configured to:
access a current date;
compare said current date to said expiration date of said stored account data to determine whether to authorize the redemption of said gift certificate.

46. A system for issuing a gift certificate drawn on a financial account, comprising:
means for identifying and accessing stored account data associated with a financial account, said stored account data including an account identifier;
means for determining a certificate identifier corresponding to said account identifier;
means for producing a gift certificate including thereon said certificate identifier; and
means for distributing said gift certificate to an owner of said financial account.

47. The system of claim 46 wherein said account identifier is linked to said certificate identifier.

48. The system of claim 46 wherein said means for producing a gift certificate includes:
means for printing said certificate identifier on said gift certificate; and
means for applying a user-alterable means for obstructing the visibility of said certificate identifier.

49. The system of claim 46 further comprising:
means for determining a security code corresponding to said gift certificate;
means for printing said security code on said gift certificate;
means for applying a user-alterable means for obstructing the visibility of said printed security code; and
means for transmitting said security code to said owner of said financial account.

50. The system of claim 46 further comprising:
means for determining a security code corresponding to said gift certificate; and
means for transmitting said security code to said owner of said financial account.

51. The system of claim 50 further comprising:
means for producing a security token storing said security code; and
means for distributing said security token.

52. The system of claim 46 wherein said gift certificate is embodied as a magnetic stripe card.

53. The system of claim 46 wherein said gift certificate is embodied as a token.

18

54. The system of claim 46 further comprising:
means for determining expiration data of said gift certificate; said gift certificate including thereon an indication of said expiration data; and
means for storing said expiration data, said account data including said expiration data.

55. The system of claim 46 further including:
means for determining a maximum redemption value of said gift certificate;
means for storing said maximum redemption value, said account data including said maximum redemption value.

56. The system of claim 46 further including:
means for determining a maximum redemption value of said gift certificate; and
means for updating said stored account data to reflect a reservation of credit equal to said maximum redemption value.

57. The system of claim 46 wherein said gift certificate includes an issuer identifier representing the issuer of said gift certificate.

58. The system of claim 46 wherein said gift certificate is embodied as an event ticket.

59. A system for redeeming a gift certificate drawn on a financial account, comprising:
means for receiving a gift certificate for payment of an identified value, said gift certificate issued by an account issuer and including thereon a certificate identifier corresponding to an account identifier, said account identifier associated with a financial account;
means for transmitting a request for authorization to a central server, said request including said certificate identifier;
means for receiving an authorization signal from said central server, said authorization signal representing an indication that redemption of said gift certificate for said identified value is authorized; and
means for receiving a payment from said account issuer based on said identified value.

60. The system of claim 59 further comprising:
means for receiving a security code; and
means for transmitting said security code to said central server.

61. The system of claim 60 wherein said means for receiving a security code includes:
means for receiving a magnetic stripe card having a security code stored thereon; and
means for reading said security code from said magnetic stripe card.

62. The system of claim 59 further comprising:
means for receiving challenge data from said central server;
means for presenting said challenge data to a bearer of said gift certificate;
means for receiving response data from said bearer of said gift certificate; and
means for transmitting said response data to said central server.

63. The system of claim 62 further comprising means for receiving a challenge-response authorization signal from said central server indicating an association between said challenge data and said response data.

64. A computer system for authorizing the redemption of a gift certificate drawn on a financial account, comprising:

means for receiving a request to authorize redemption of a gift certificate for an identified value, said request including a certificate identifier;

means for determining an account identifier based on said certificate identifier;

means for accessing stored account data associated with said account identifier;

means for analyzing said account data to determine whether to authorize the redemption of said gift certificate;

means for transmitting an authorization signal to a remote terminal, said authorization signal representing an indication that redemption of said gift certificate for said identified value is authorized;

means for updating said account data to reflect redemption of said gift certificate for said identified value.

65. The system of claim 64 further comprising:

means for receiving a security code from a remote terminal; and means for comparing said received security code to a stored security code.

66. The system of claim 64 wherein said stored account data includes an expiration date, said system further comprising:

means for accessing a current date;

means for comparing said current date to said expiration date of said stored account data to determine whether to authorize the redemption of said gift certificate.

67. A computer-readable storage medium encoded with processing instructions for implementing a method for issuing a gift certificate drawn on a financial account, said processing instructions for directing a computer to perform the steps of:

identifying and accessing stored account data associated with a financial account, said stored data including an account identifier;

determining a certificate identifier corresponding to said account identifier;

producing a gift certificate including thereon said certificate identifier; and distributing said gift certificate to an owner of said financial account.

* * * * *